Aug. 1, 1933.  F. H. LOBB  1,920,908
MACHINE FOR MAKING ARTICLES FROM MOLTEN MATERIAL
Original Filed April 29, 1921   10 Sheets-Sheet 1

Fig. 1.

Inventor:
Frank H. Lobb,
by Robson Brown
Atty.

Aug. 1, 1933.  F. H. LOBB  1,920,908
MACHINE FOR MAKING ARTICLES FROM MOLTEN MATERIAL
Original Filed April 29, 1921  10 Sheets-Sheet 2

Inventor:
Frank H. Lobb,
by Robson D Brown
Atty.

Aug. 1, 1933.　　　　F. H. LOBB　　　　1,920,908
MACHINE FOR MAKING ARTICLES FROM MOLTEN MATERIAL
Original Filed April 29, 1921　　10 Sheets-Sheet 6

Inventor:
Frank H. Lobb,
by Robson D Brown
Atty.

Patented Aug. 1, 1933

1,920,908

UNITED STATES PATENT OFFICE 1,920,908

MACHINE FOR MAKING ARTICLES FROM MOLTEN MATERIAL

Frank H. Lobb, Ridley Park, Pa., assignor, by mesne assignments, to Hartford-Empire Company, Hartford, Conn., a Corporation of Delaware Original application April 29, 1921, Serial No. 465,440. Divided and this application August 22, 1927. Serial No. 214,691

42 Claims. (Cl. 49—55)

My invention relates to a method of and apparatus for delivering molten glass from a source of supply in such a manner that the glass delivered to the forming or shaping machine is well adapted to the ware fashioning operations.

The method and apparatus hereinafter more fully described has among its objects, the provision of a suitable delivery of the molten glass from the supply source and a preliminary treatment or handling thereof as will best suit the character of ware to be produced or fabricated and the instrumentalities employed toward that end. The several steps and the mechanism employed also contemplate a predetermined cyclic order, variable, however, in several of its phases to accommodate varying conditions, for example changes in the character of the molten glass being delivered, the cycle of the shaping machine, or kind of ware to be produced.

The present application is a division of my prior application, serial number 465,440 filed April 29, 1921.

Figures 6, 7:
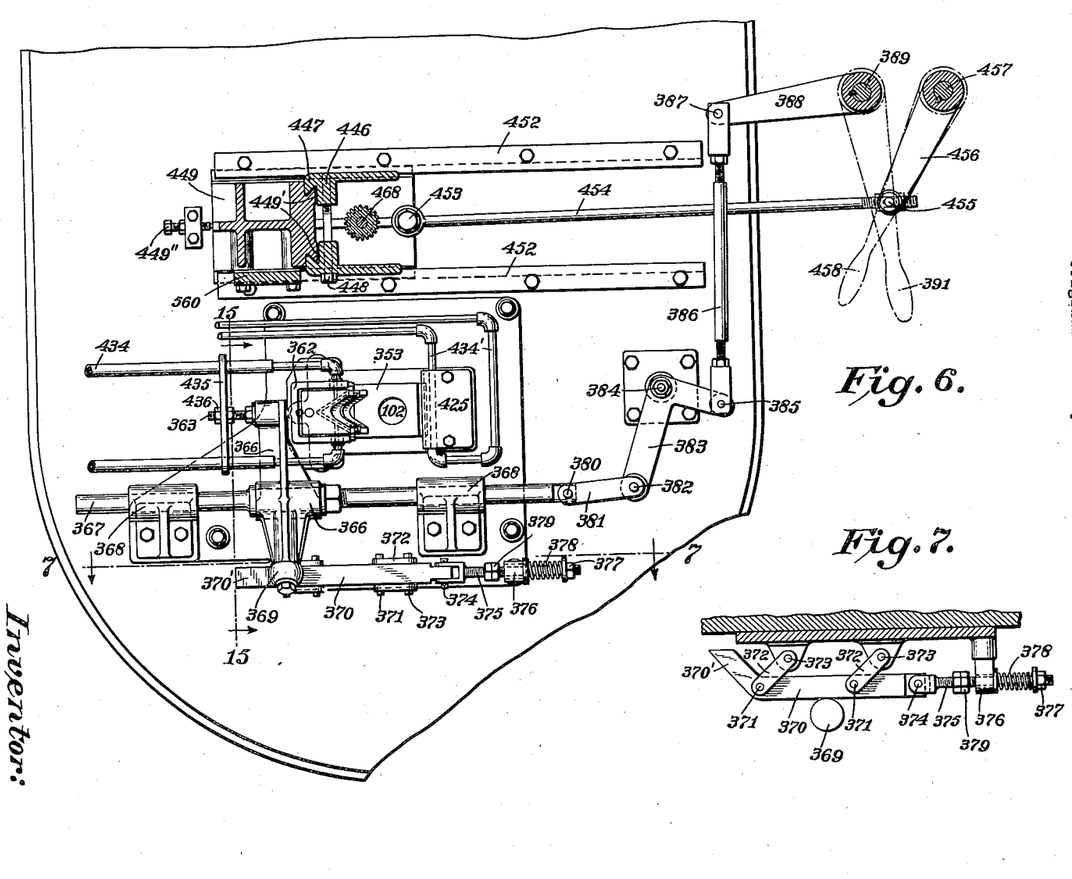
Fig. 6 is a bottom view of the cut-off knife and certain other mechanisms operating near the outlet of the furnace, with parts in section.
Fig. 7 is a vertical section on line 7—7 of Fig. 6.

At 100 (Fig. 1) I have indicated the wall of a glass melting furnace of any suitable construction, with an auxiliary furnace or tank 101 (Figs. 2, 6, 14 and 15) receiving glass from the main furnace and delivering said glass, at times through the outlet 102 (Figs. 6, 14 and 25), as will be described below. The manner of conveying the glass from the main furnace to the tank 101 is immaterial to my invention and this detail has not been illustrated.

The shaping or forming machine which receives the molten glass from the feeding and delivering mechanism includes molding mechanism by the aid of which the glass is shaped or fashioned into the completed article. The forming or shaping machine comprises in part a base 108 (Fig. 1) which supports the several glass working instrumentalities, the base being movable or adjustable to locate the shaping machine in proper working relation to the glass feeding and delivering mechanism.

The base 108 carries rigidly a central vertical pillar 119 (Fig. 1) having a reduced upper portion 119'. To the upper part of the pillar portion 119' is further secured rigidly a spider-like support 121 to which is secured in part certain instrumentalities hereinafter described. The parts mentioned so far are all stationary during the normal operation of the machine.

Figure 1:
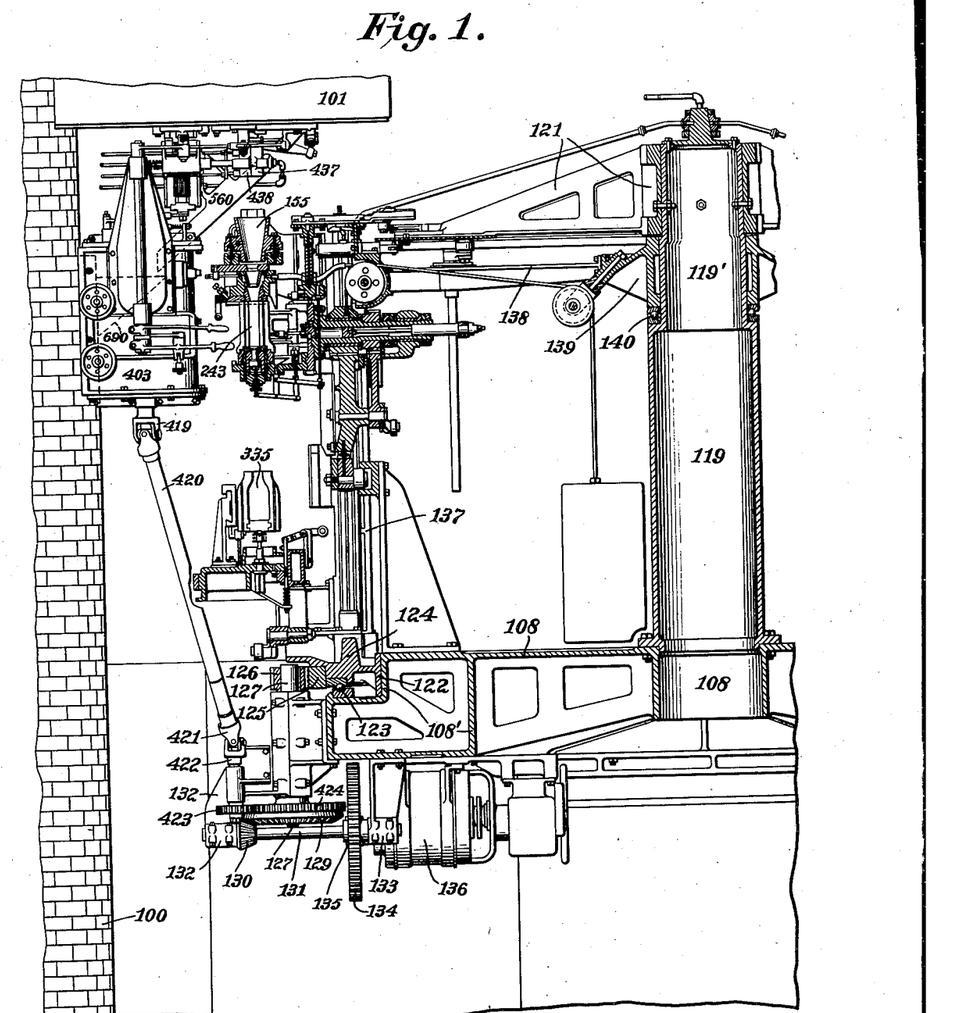
Fig. 1 is a side view of the feeding and delivering mechanism and illustrates the location of the shaping machine in respect thereto.

The base 108 is provided with a cylindrical portion 108' forming a guide for the lower hub portion 122 of the rotary carrier. An annular ball bearing 123 is interposed between the base 108 and the adjacent portion of the carrier. To the annular lower portion 124 of the carrier is also secured rigidly a rim 125 provided with spur teeth in mesh with a pinion 126 on a vertical shaft 127, journaled in a bearing on the base 108. At its lower end the shaft 127 carries rigidly a bevelled wheel 129, in mesh with a bevelled pinion 130 on a horizontal shaft 131 journaled in brackets 132, 133, rigid with the base 108. The shaft 131 also carries a spur gear 134 in mesh with a pinion 135 on the horizontal shaft of an electric motor 136 suitably secured to the base 108. By this arrangement the entire carrier connected with the toothed rim 125 will be rotated continuously on the base 108.

Rigidly secured to the carried portion 124 are parallel uprights 137 (Fig. 1), equi-distant from each other, and all at the same distance from the axis about which the carrier rotates, (the vertical axis of the pillar 119). The upper portions of the uprights 137 are secured rigidly to the outer ends of radial arms 138 the inner ends of which are secured to the periphery of an upper hub portion 139 surrounding the pillar portion 119' below the support 121, and preferably resting on a ball bearing 140.

From the above it will be seen that the annular portion 124 and the radial arms 138, connected together by the uprights 137, constitute the carrier heretofore referred to which, through the motion imparted to the teeth formed on the rim 125 fast to the lower portion 124, rotates about the vertical axis of the machine or the center line of the stationary pillar 119.

Figure 27:
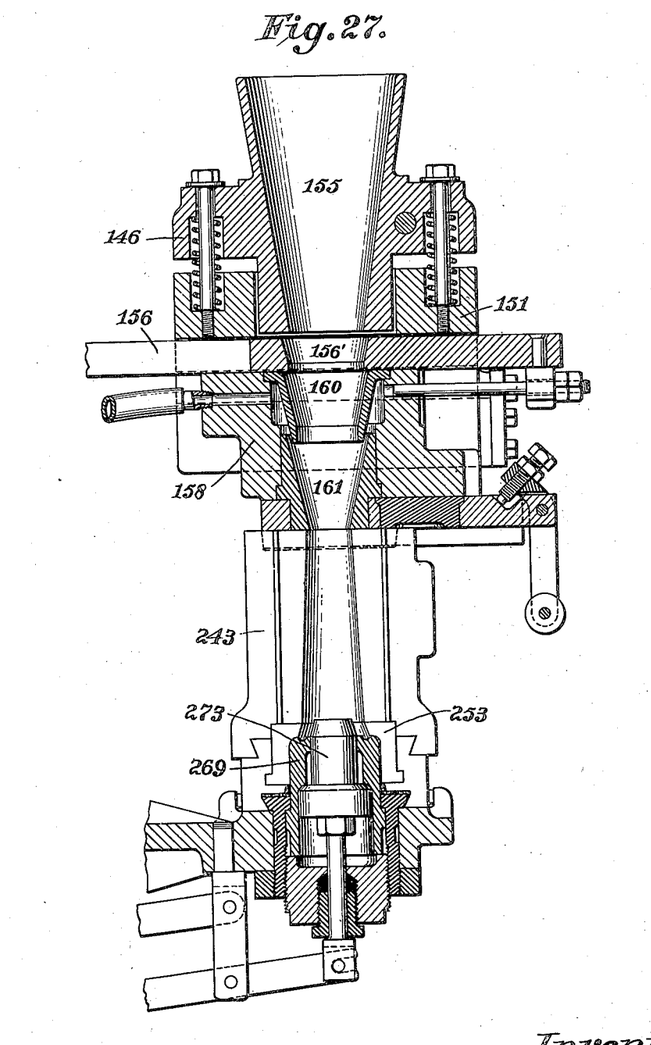
Fig. 27 is an enlarged view of part of the forming machine illustrated in Fig. 1 showing one of the blank molds and the cooperating mechanism in position to receive a charge of glass from the feeding and delivering mechanism.

Suitably supported upon the carrier and arranged to travel therewith are several of the major or more important ware fashioning instrumentalities. These parts include several sets of mechanisms each set constituting in the main a complete glass shaping unit. Since the several sets are alike, a brief reference to one set will suffice. Each unit consists principally of a partible blank mold 243, a partible neck mold 253 and a nipple 269 and a mouth forming pin or plunger 273 (Fig. 27). Air under pressure is arranged, through suitable connections, to aid the working of the glass in the blank mold.

The blow head body 146 has a funnel shaped passage 155 the lower end of which extends into a suitable opening of the carrier 151 and close to the path of an upper slide 156 having an opening or passage 156' of circular cross section adapted for registering with said funnel shaped passage. The lower surface of the slide 156 is adapted to engage the upper surface of a lower slide 158. The lower slide 158 also has a passage adapted to register with the passages 155, 156', said passage of the lower slide being formed of two superposed funnels 160, 161, the outlet of the lower funnel 161 being smaller than that of the upper funnel, and of about the same size as the bottom opening of the blank mold. The lower funnel is exchangeable to fit different blank molds. The above parts, when at the charging station, occupy the positions illustrated in Fig. 27, the glass delivered by the feeding and delivering mechanism passing through the several funnel shaped passages without deformation into the blank mold 243. After the plastic glass has been fashioned preliminarily in the blank mold it is transferred to a partible blow mold 335 (Fig. 1) where at the proper time, air is admitted into the interior of the glass blank to expand the same to final form, thus concluding the fashioning or shaping of the article. The several instrumentalities of the forming machine above referred to, together with associated devices are described in detail in my original application, Ser. No. 465,440.

The following device is employed for controlling the flow of glass from the outlet 102 of the auxiliary furnace 101, to the funnel 155 and to the blank mold 243, neck mold 253, and nipple 269 (Figs. 6, 7, 13, 14 and 15). It will be understood that the axis of the outlet 102 is so located that as the carrier rotates, the axis of the funnel passage 155 of each set will at a certain time be exactly or approximately in line with said outlet axis. Adjacent to the outlet 102 is a stationary perforated wear-plate or guide-plate 353, along the lower surface of which a knife 354 is arranged to slide or reciprocate. At its forward or cutting portion, the knife is V-shaped, and the bottom or angle of the V-groove is inclined upwardly or forwardly, as shown best in Fig. 14. To facilitate replacement in the case of wear, the knife blade 354 is a separate piece set loosely on a carrier 355, the latter having a pin 356 projecting upwardly into a corresponding recess of the knife blade, and also having longitudinal ribs 355' at each side, to hold the blade 354 in proper position. The front portion of the carrier 355 has a V-groove 357 lying in the continuation of the V-groove of the knife, but preferably the uppermost portion 357'. of this groove is vertical instead of inclined, thus forming a shoulder or recess between the inclined groove surfaces of the knife 354 and of the carrier 355. The latter has two horizontal cooling chambers 358 converging in V-fashion, corresponding to the shape of the cutting edge, and two transverse aligning channels 359 communicating with said channels 358 and terminating in aligning horizontal nipples 360. These nipples form trunnions resting loosely in elongated bearing slots 361 (preferably open at the top) formed at the ends of a fork 362, the shank 363 of which carries a nut 364 and washer 364' holding said shank against longitudinal movement relatively to one end 365 of an arm 366 in which said shank is journaled. The arm 366 is mounted to turn on a rod 367 yet held to move lengthwise with said rod, which slides in stationary bearings 368. The other end of the arm 366 carries a roller 369 adapted to travel on the lower surface of a track 370 parallel to the rod 367. This track has pivotal connections at 371 (Fig. 7) with parallel links 372 fulcrumed at 373, and is also connected pivotally at 374 with a rod 375 extending through a stationary guide 376 and carrying an adjustable nut and washer 377, a coiled spring 378 being interposed between the washer and said guide and tending to force the track 370 downward. As the roller 369 travels along the lower surface of this track, the spring 378 will press the arm 366 upward at the knife-carrying end, so that the knife 354 will be held against the wear-plate 353. Owing to the fact that the fork 362 has its shank 363 journaled in the end 365 of the arm 366, one of the trunnions may rise and the other descend, enabling the upper surface of the knife to fit with absolute accuracy against the lower surface of said wear-plate. In the normal operation of the knife, the roller 369 remains in contact with the horizontal main portion of the track 370. By means to be described presently, the rod 367 with the knife and the roller 369 can be given an extra or abnormal throw in the direction away from the guide 376, thus carrying the roller 369 out of contact with the horizontal main portion of the track 370, and into engagement with the upwardly-inclined end portion 370' of said track. Since the knife, its carrier, and the parts connected therewith are considerably heavier than the part of the arm 366 carrying the roller 369, gravity will cause the knife to swing away from the wear-plate 353 whenever the roller 369 is moved to the inclined track portion 370', see Fig. 15, thus rendering the knife 354 readily accessible for renewal, since in this position it can be readily lifted from the carrier 355. Under these conditions, the spring 378 will pull the track 370 somewhat to the right of the position Fig. 7, until the adjustable stop nut 379 engages the guide 376. The roller 369 is always in engagement either with the horizontal main portion 370 or with the inclined extension 370' of the track.

Figures 2, 3, 4:
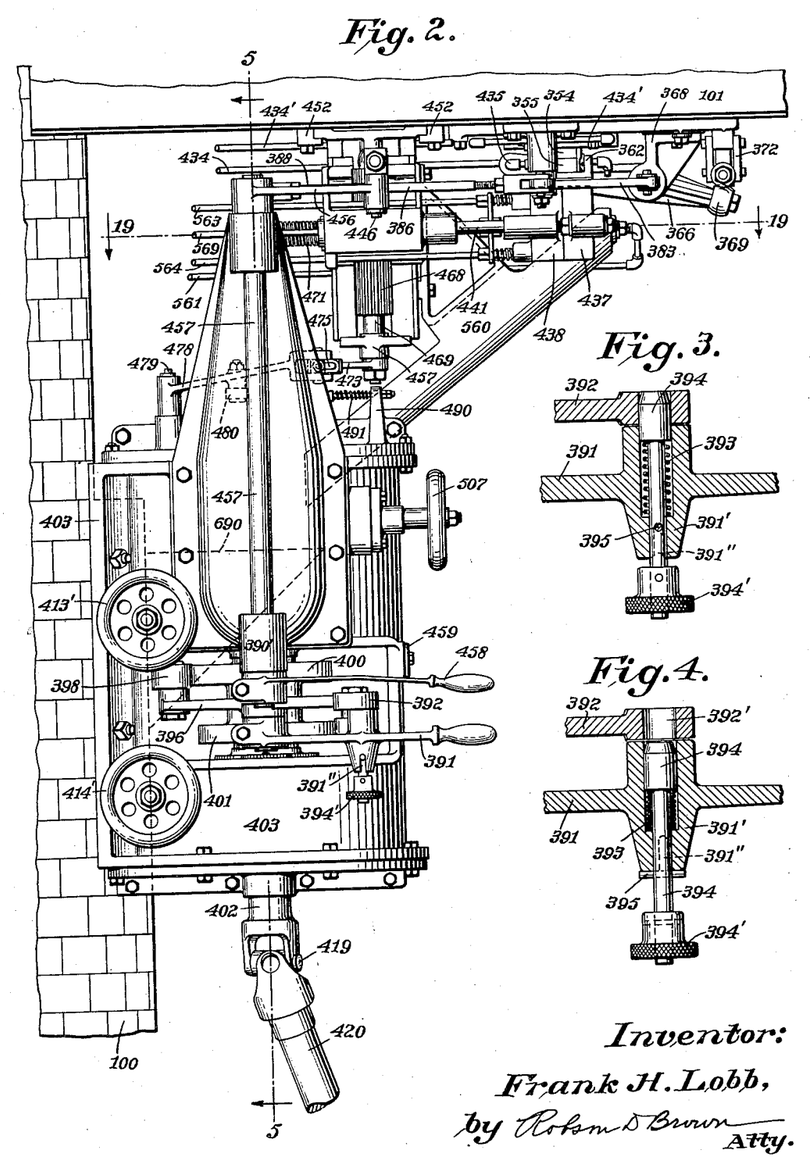
Fig. 2 is an enlarged side view of the feeding and delivering mechanism.
Figs. 3 and 4 are detailed vertical sections of certain parts of the gear box mechanism.
Figure 5:
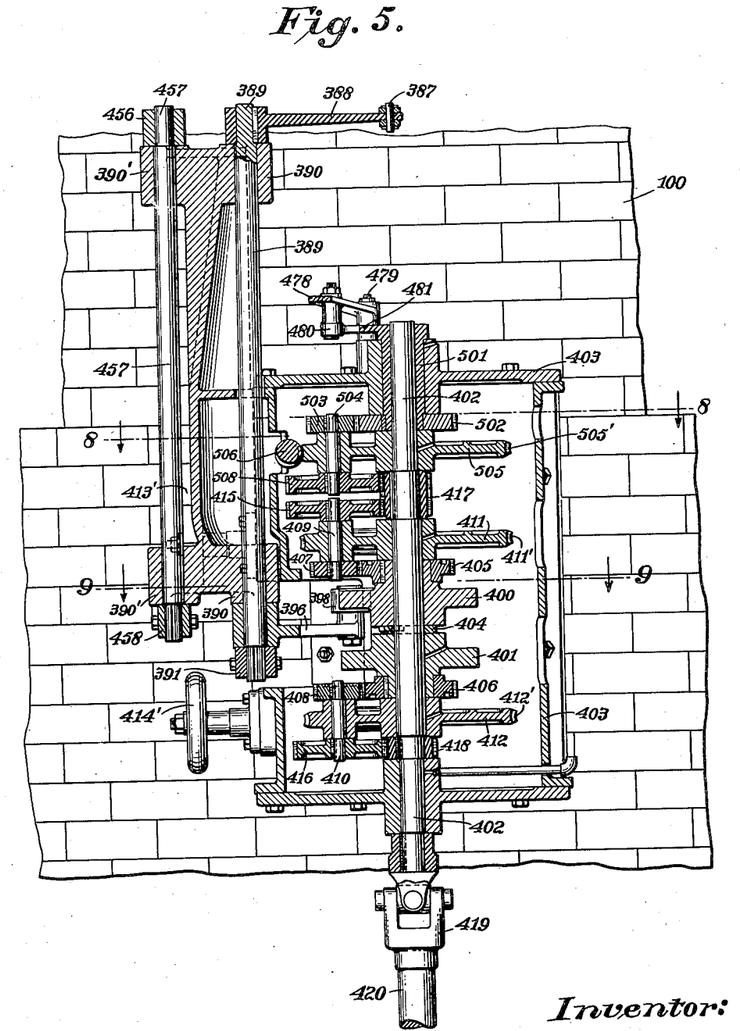
Fig. 5 is a vertical section of a gear box and mechanism contained therein taken on the line 5—5 of Fig. 2.
Figure 9:
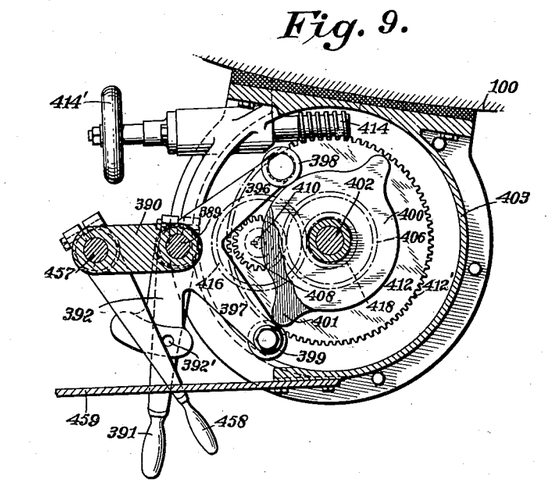
Figure 10:
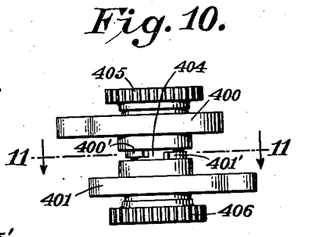
Fig. 10 is a detail elevation of the cams contained in the gear box.

The rod 367 is pivotally connected at 380 with a link 381 having a pivotal connection at 382 with an elbow lever 383 mounted to swing about a stationary fulcrum 384. The other arm of said lever has a pivotal connection at 385 with a preferably extensible link 386 pivotally connected at 387 with a crank arm 388 keyed on the upper end of a rock shaft 389 journaled in stationary bearings 390 (Fig. 5). To the lower end of said shaft is keyed or clamped the hub of a handle 391, which therefore rocks in unison with said shaft and crank. Adjacent to the handle 391 (Fig. 9) a three-armed lever is mounted loosely on the shaft 389, one arm 392 of said lever having an opening 392' into which is adapted to project, under the influence of a spring 393 (Figs. 3 and 4), the head of a connecting pin 394 mounted to slide in a socket 391' of the handle 391, in a direction parallel to the shaft 389. The coupled position of the handle 391 and lever arm 392 is shown in Fig. 3, when it is desired to release the handle from the lever, so that said handle may be swung independently to the position in which the roller 369 engages the track portion 370', and the knife drops to the position shown in Fig. 15, the pin 394 is pulled down by means of the knob 394', at its lower end, to bring the head of the pin out of the opening 392', and the pin may be locked in this position by turning it on its axis so that a cross pin 395 carried by said pin may engage the bottom of the socket 391'. Normally, the ends of the said cross pin are received in longitudinal slots 391'' of the socket 391.

Figure 8:
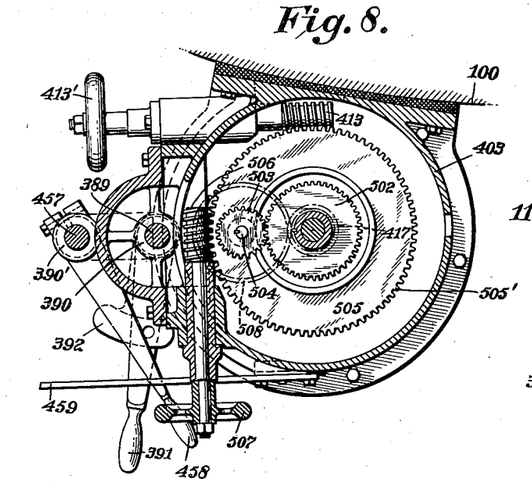
Figs. 8 and 9 are horizontal sections on the lines 8—8 and 9—9 respectively, of Fig. 5.

The lever of which the arm 392 forms part, has two other arms 396, 397 (Fig. 9) carrying rollers 398, 399 respectively in engagement with cams 400 and 401 (Figs. 5, 10, 11, and 12) both mounted loosely on a vertical shaft 402 journaled in a gear box 403, the cams being held apart by a collar 404 loose on the said shaft. The cams have lugs 400', 401' respectively projected toward the companion cams exteriorly of the collar 404, and equi-distant from the axis of the shaft 402, so that in certain positions (Fig. 12) the two lugs will come in contact. With the cams 400, 401 are connected rigidly gear wheels 405, 406 respectively, (Fig. 5) in mesh with pinions 407, 408 respectively secured to vertical shafts 409, 410 respectively journaled eccentrically in disks 411, 412 respectively. These disks are normally stationary, but are mounted loosely on the shaft 402, and may be adjusted circumferentially by means of two independent horizontal worms 413, 414 (Figs. 8 and 9) respectively journaled in the gear box 403 and in mesh with worm teeth 411', 412' at the peripheries of the disks 411, 412 respectively. The shafts of the worms are provided with handwheels 413', 414' respectively, and not only serve to adjust the disks 411, 412 and with them the shafts 409, 410 about the shaft 402, but also hold the disks against accidental movement. On the ends of the shafts 409, 410 opposite to the pinions 407, 408 respectively, are secured rigidly gear wheels 415, 416 in mesh with pinions 417, 418 respectively which are rigid with the shaft 402. This shaft is driven by means of a universal joint coupling 419 from an extensible shaft 420 (consisting of an upper sleeve portion and a lower rod portion fitted into the sleve slidably, yet held to rotate therewith), the lower end of which is connected by a similar universal joint coupling 421 (Fig. 1) with a short vertical shaft 422 journaled in the bracket 132 and carrying a pinion 423, in mesh with a spur gear 424 on the shaft 127.

Figure 13:
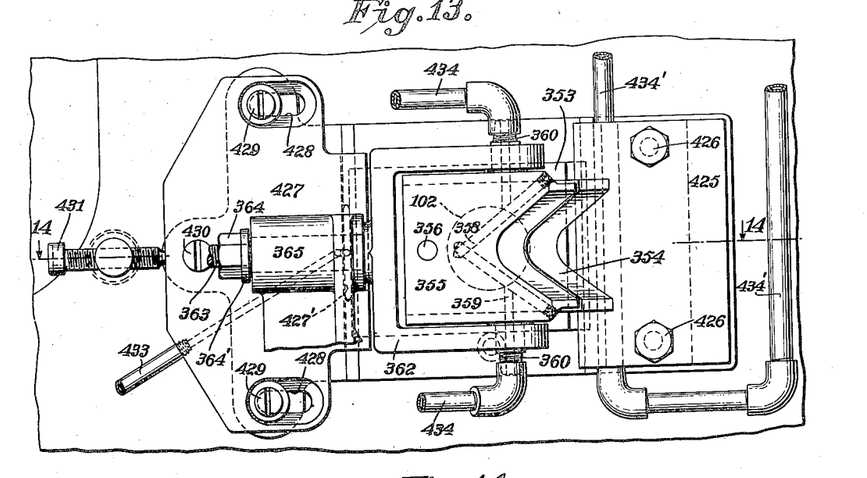
Fig. 13 is a bottom view of the knife mechanism.
Figure 14:
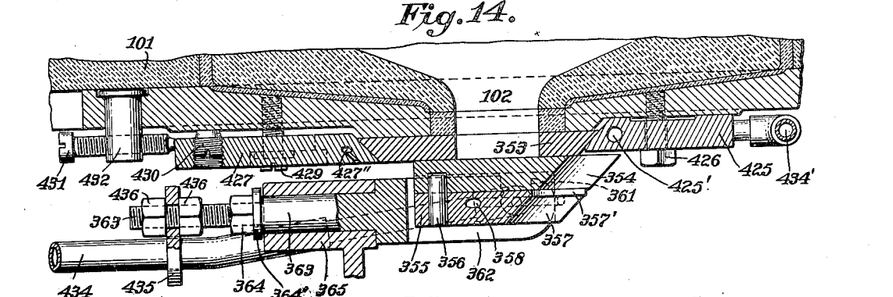
Fig. 14 is a vertical section on the line 14—14 of Fig. 13.
Figure 15:
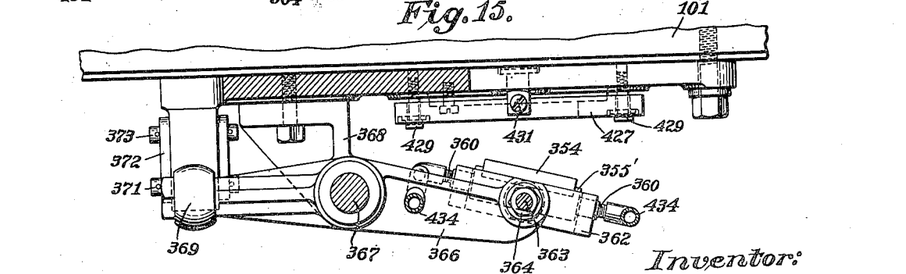
Fig. 15 is an elevation partly in section on the line 15—15 of Fig. 6, but showing the knife in a different position.

The knife 354 and its carrier 355, together with the rod 367, are arranged to reciprocate in a direction such that the locus of the central point of the knife (corner of the V) is tangential to the cylindrical surface which the axes of the blow heads and of the blow molds describe during the rotation of the carirer. The wear-plate 353 is beveled at two opposite edges, one of which is engaged by a plate 425 (Figs. 13 and 14) having a corresponding undercut edge and secured to the tank or furnace 101 by bolts 426. The other beveled edge of the wear-plate 353 is engaged by the undercut edge of an adjustable plate 427 having slots 428 (parallel to the path of the knife 354) through which extend vertical adjusting screws 429 fitted to said tank 101. The plate 427 is always adjusted in such a manner that its lower surface will be flush with the lower surface of the wear-plate 353, as shown in Fig. 14, and the knife 354 during its reciprocation engages said plates 353 and 427 alternately. The lower surface of the plate 425 however is normally at a level above that of the lower surfaces of the plates 353—427. When the lower surface wears unevenly, so that they are no longer flush, their proper relation is restored by adjusting the plate 427 up or down as required. The screws 429 press said plate upward, while another screw 430 presses this plate downward, the upper end of the screw 430 engaging the lower surface of the tank 101, but sliding in or out along said surface as the plate 427 moves slightly inward or outward simultaneously with its downward or upward movement respectively, said plate 427 being pressed inwardly against the wear-plate 353 by a screw 431 fitted into a post 432 projecting downwardly from the tank 101.

On its lower face, the plate 427 is provided with a channel 427' transverse to the path of the knife 354 and connected with an internal duct 427'' receiving oil continuously from a suitable source through a pipe 433, to lubricate the contact faces of the knife and of the plates 427 and 353 along which it reciprocates.

One of the nipples 360 of the knife carrier 355 is connected to a source of water or other cooling liquid by one of the pipes 434, the other nipple being connected with the other pipe 434 which serves to carry off the liquid which has passed through the channels 358, 359. The pipes 434, which reciprocate with the knife, preferably rest on an additional support 435 secured to the shank 363 by means of nuts 436. The plate 425 has a channel 425' adjacent to the wear-plate 353, so that water for cooling purposes may be admitted through one of the pipes 434' and carried off through the other.

Figure 26:
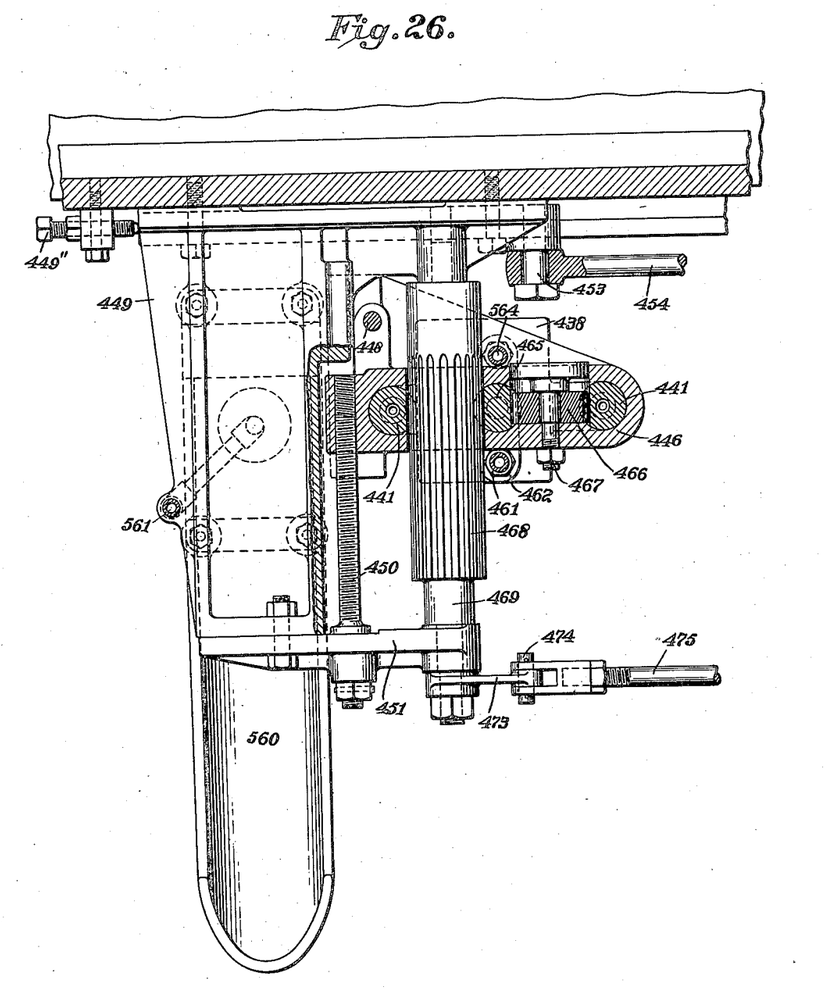
Fig. 26 is a vertical section on the line 26—26 of Fig. 19.

Beneath the outlet 102 of the auxiliary furnace or tank 101, and below the path of the knife 354, is arranged a device which I term a "forming cup" for guiding and forming the glass as it drops from the knife to the funnel or guide member 155. This cup (Figs. 19, and 21 to 25) comprises two sections 437, 438 each having a conical or flaring recess 439 connected at the bottom with a semi-cylindrical groove 440, to form together a funnel-shaped passage extending through the cup from top to bottom when the two sections are in contact or "closed", as in Fig. 21. The cup section 437 is connected with two parallel horizontal rods 441 extending transversely to the path of the knife 354, the connection being effected by means of nuts 442 (Fig. 21) screwed on said rods and engaging the ends of sleeves 443 through which said rods extend, said sleeves being integral with the section 437. The rods 441 have a sliding fit in sleeves 444 integral with the other cup section 438, and also in sleeves 445 projected from a vertically adjustable carrier 446 formed integral with jaws 447 which by means of a clamping screw 448 (Fig. 6) may be tightened upon the vertical guide 449' on a slide 449. A vertical screw 450 (Fig. 26) is mounted to turn, without longitudinal motion, in a plate 451 secured to the slide 449, said screw being in threaded engagement with the carrier 446 (Fig. 26), so that, after loosening the screw 448, the said carrier may be adjusted up or down by turning said screw 450. The slide 449 moves horizontally along guides 452 (Fig. 6) secured to the tank 101 and parallel to the path of the knife 354. By a vertical pivot 453, the slide 449 is connected with a rod 454 having a longitudinally-adjustable pivotal connection 455 with a crank arm 456 mounted to rock in unison with a vertical shaft 457 journaled in stationary bearings 390' (Fig. 5). The lower end of said shaft is connected rigidly with a handle 458 (Fig. 8) of a resilient character and normally snapped into a notch 459' (Figs. 2 and 19) in a plate 459 attached to the gear box 403. In this position the slide 449 engages a stop screw 449'' (Figs. 6 and 26) adjustable lengthwise of the guides 452.

To the cup section 438 are secured rigidly, as by screwing them into bosses 444', two pins 460 extending parallel to the rods 441 and provided with heads 461. A plate or cross head 462, mounted to slide on said pins, is normally pressed against the heads 461 by springs 463 coiled around the said pins. To said cross head is secured rigidly, as by nuts 464, a rod 465 parallel to the rods 441 and located between them, in the same horizontal plane. Where the rods 441, 465 extend into the carrier 446, they are provided with rack teeth in their opposing surfaces (see Fig. 19), and an idle pinion 466 journaled in the carrier 446, about a vertical axle 467, meshes with the rack teeth of the rod 465 and of one of the rods 441. The teeth of the other rod 441, and the corresponding teeth of the center rod 465, are in mesh with a long pinion 468, carried by a vertical shaft 469 (Fig. 26) which is journaled in the slide 449 and its plate 451. The vertical adjustment of the carrier 446 relatively to the slide 449 therefore will not disturb the meshing of the pinion 468 with the respective rack teeth of the rods 441 and 465. The center rod 465 has a head 470 against which bears a coiled spring 471 the other end of which bears against a washer 472 engaging the carrier 446, the spring therefore tending to move the forming cup sections 437, 438 to the open position shown in Fig. 19. Copper washers 442' (Fig. 21) serve to obtain liquid-tight joints.

Figure 20:
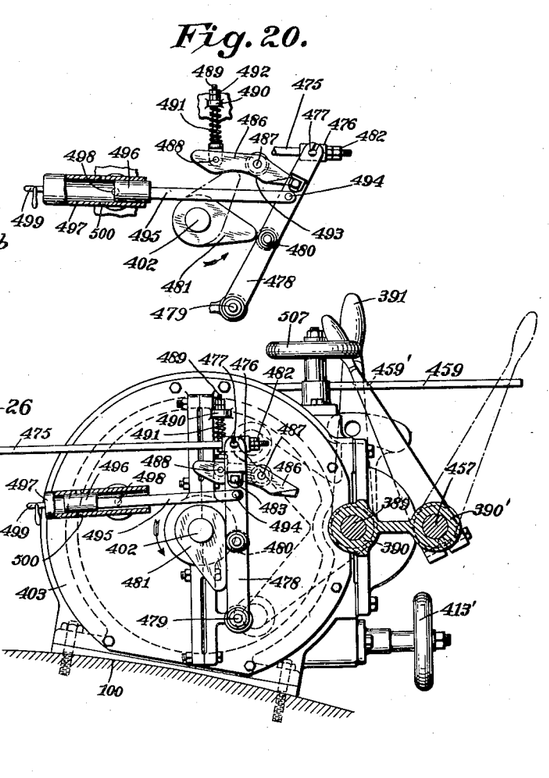
Fig. 20 is a plan of some of the parts shown in Fig. 19 in a different position.

At the lower end of the rock shaft 469 is secured a crank arm 473 (Figs. 2 and 26), pivotally connected at 474 with a link 475 the other end of which is mounted to slide in a sleeve 476 (Fig. 20) having a pivotal connection at 477 with a lever 478 fulcrumed at 479 on the cover of the gear box 403. The lever carries a roller 480 operated by a cam arm 481 which is rotated around the shaft 402 as described below. The outer end of the sleeve 476 is adapted to engage one of the nuts 482 secured to the rod 475, to operate said rod outwardly (toward the right in Fig. 19). The lever 478 also carries a projection 483 (Figs. 16 to 19, inclusive), adapted to ride at times along an inclined surface 484, and at others to lie against a stop surface 485, both of said surfaces being formed on a lever 486 fulcrumed at 487. At 488 (Figs. 19 and 20), the lever 486 is connected pivotally with a rod 489 passing through a stationary guide 490 and a spring 491 coiled on said rod, tends to press the connection 488 toward the shaft 402, such inward movement being limited by nuts 492 screwed on the outer end of the rod 489. The lever 486 has a rounded surface 493 adapted to be engaged by the outer end of the cam arm 481 as the same sweeps along such surface during the rotation of the shaft 402. Furthermore, at 494 the lever 478 is connected pivotally with a rod 495 at the other end of which is a piston 496 fitted to slide in a cylinder or dash-pot 497 which is fulcrumed at 498 to the cover of the gear box 403. The action of the dash-pot may be regulated by means of a cock or valve 499 for increasing or decreasing the effective cross section of the passage from the head of the dash-pot to the surrounding air. The cylinder 497 has lateral holes 500 adapted to be covered and uncovered at times by the piston 496 as will be described below.

The cam arm 481 is driven as follows: Said arm is integral with a sleeve 501 (Fig. 5) journaled in the cover of the gear box 403 and the upper end of the shaft 402 extends into said sleeve loosely. A gear wheel 502, mounted to turn in unison with said sleeve, meshes with a pinion 503 at the upper end of a vertical shaft 504 journaled eccentrically in a disk 505 which is normally stationary, but may be adjusted around the shaft 402, by means of a worm 506 engaging worm teeth 505' on the periphery of said disk, said worm being journaled on the gear box 403 and provided with a handwheel 507. On the lower end of the shaft 504 is keyed or otherwise secured a gear wheel 508 in mesh with the pinion 417.

To the slide 449 is secured an inclined trough 560 (Figs. 1, 2, 19 and 26) located at one side of the forming cup 437, 438, so that by the movement of said slide along the guides 452, either the forming cup or the trough may be brought into position to receive the glass issuing from the outlet 102. Water supplied through a pipe 561 (Figs. 2 and 19) is injected or sprayed into the trough 560 at its upper end through a spray head or nozzle 562 having a plurality of narrow openings. The forming cup 437, 438 also has cooling means as follows (Figs. 21 to 24): The pins 460 with their heads 461 have axial passages, connected at the head ends with pipes 563, 564 respectively (Fig. 2), one of which serves to supply cooling water, and the other to carry off the water from a set of cooling channels 565 in the forming cup section 438, said channels communicating with the passages of the pins 460, by ducts 566 (Figs. 21 and 22) in the bosses 444'. Similarly, the forming cup section 437 has a set of cooling channels 567 (Figs. 21 and 23) connected with annular chambers formed in the sleeves 443 by making the rods 441 with reduced portions 441'. The rods also have apertures 441'' by which their interior communicates with said annular chamber, and water is supplied to one of the rods by a pipe 568, and carried off from the other by a pipe 569 (both pipes being shown in Fig. 19, and the pipe 569 being also shown in Fig. 2).

Figures 21, 22, 23, 24, 25:
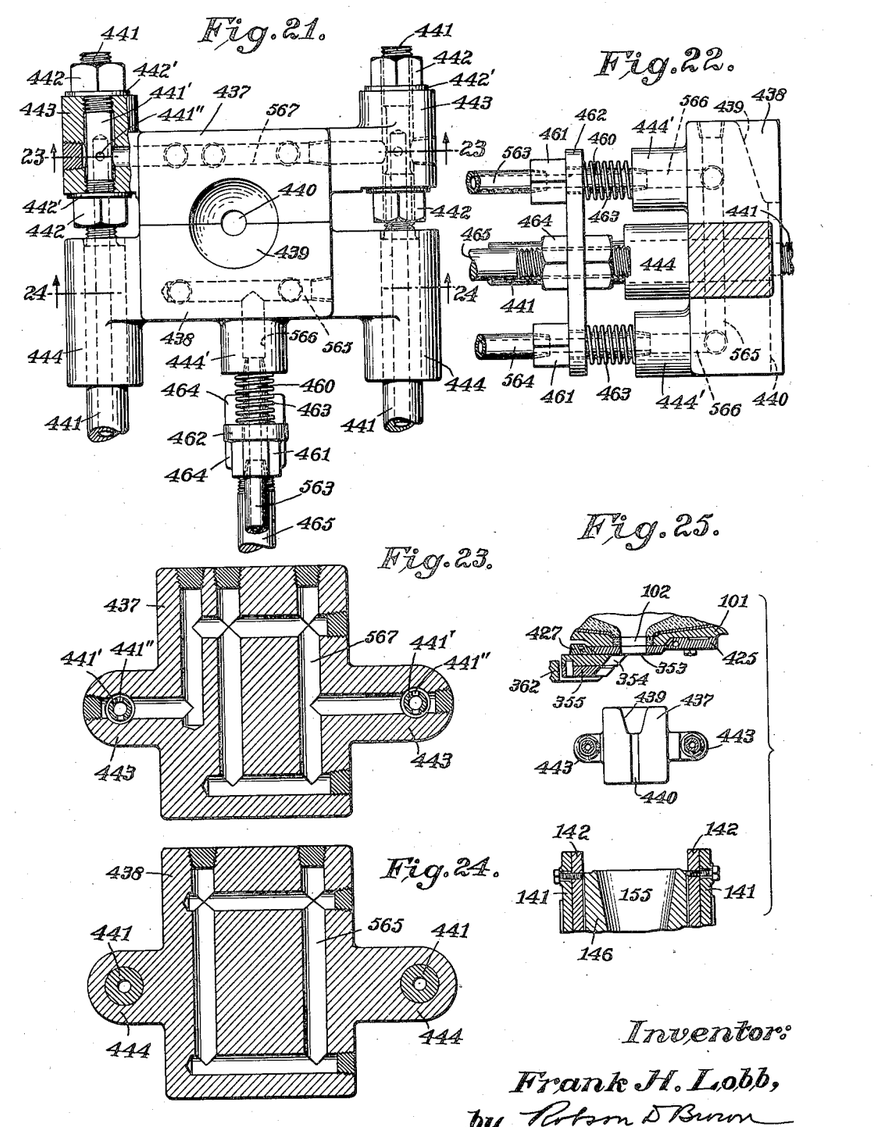
Fig. 21 is a plan view of a "forming cup" with parts in section.
Fig. 22 is an elevation of one-half of the forming cup, with parts in section.
Figs. 23 and 24 are vertical sections on the lines 23—23 and 24—24 respectively of Fig. 21.
Fig. 25 is a vertical section illustrating the relation of the glass outlet on the furnace, the knife, the forming cup, and a part of the forming machine.

The operation of the machine is as follows:

Let us assume an initial position in which the outlet 102 is closed by the knife 354 as in Figs. 13 and 14 and the forming cup 437, 438 closed as in Fig. 21, and in its normal position, that is to say, in operative relation to said outlet, substantially as in Fig. 25, with the blank mold and neck mold below, in operative position to receive a charge as in Fig. 27. At a certain moment, outlet 102 is opened to the position shown in Fig. 25 by moving the knife 354 to one side, in a direction tangential to the path of the funnel, blank mold and associated parts, and opposite to the direction in which the said parts move. This opening movement of the knife is obtained by the action of the rotating cam 401 (Figs. 9 to 12) on the roller 399, thereby swinging the lever arms 397, 396 and 392. Through the pin 394, which normally is in the connecting position, Fig. 3, the lever arm 392 takes along with it the handle 391, and, since the latter is keyed to the shaft 389, Fig. 6, this shaft is rocked in one direction (contra-clockwise with reference to Fig. 6) until it reaches the position shown in Fig. 6. By means of the crank arm 388, link 386, elbow lever 383, link 381, rod 367 and arm 366, this movement of the rock shaft 389 is transmitted to the fork 362, knife carrier 355 and knife 354, bringing the latter to the position in which it uncovers the outlet 102, as in Figs. 6 and 25. During its movements, the knife 354 is pressed against the wear-plate 353 and the plate 427 (Fig. 14), by the action of the spring 378 (Figs. 6 and 7) which presses the track 370 downward, and by the pressure of said track on the roller 369 traveling along it, tends to turn the arm 366 on the rod 367 in such a manner as to press the knife 354 upward. In its movement, the knife is lubricated by oil supplied from the pipe 433 (Fig. 13) to the channel 427' and duct 427'' of the plate 427. The knife carrier 355 and the knife 354 are cooled by water supplied through one of the pipes 434 to the channels 358, 359 of said carrier, and the plate 425 is cooled by water admitted to the channel 425' from one of the pipes 434'.

When the outlet 102 has thus been cleared, glass will flow from the tank 101 and the depending end of the flowing glass will enter the recess 439 of the closed forming cup 437, 438, the grooves 440 forming a channel, open at the bottom, through which air may escape. The parts are in the position Fig. 25, the forming cup, as stated, being closed, as shown best in Fig. 21. The purpose of this forming cup is to temporarily support the lower end of the flowing glass, so as to preserve its proper shape and prevent undue elongation.

Thereupon follows the cutting or severing movement of the knife 34, which movement is in a direction tangential to the path of the blow head, and corresponding to the direction in which the blow head rotates about the pillar 119, so that the knife and blow head will, to a certain extent, move in the same direction during the cutting operation. This operation is brought about by the action of the cam 400 on the roller 398 (Figs. 5 and 9 to 12), thereby swinging the lever 396, 397, 392 and the shaft 389 in the direction opposite to that described with reference to the action of the cam rod. The knife 354 is thus brought (by the same mechanism as explained above in connection with the opening movement of the knife) from the open position Figs. 6 and 25, to the closed or cut-off position shown in Figs. 13 and 14. The fact that knife and funnel and blank mold move in substantially the same direction during the cutting operation, causes the glass severed by the knife, to follow the funnel and blank mold in its rotation, as it were, thus preserving for a greater length of time the relation during which the funnel and blank mold properly receive the glass thus severed. A relatively considerable speed may thus be given to the rotary carrier on which the funnel and blank mold are mounted, and the output of the machine is increased correspondingly.

Figure 11:
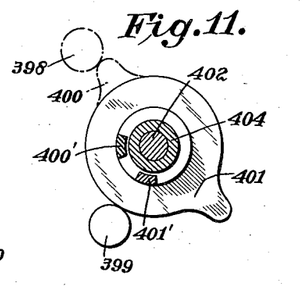
Figs. 11 and 12 are horizontal sections of said cams and the adjacent parts, taken in a plane indicated at 11—11 in Fig. 10, and showing two different adjustments of the cams.
Figure 12:
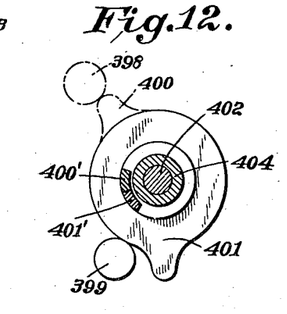

The timing of the knife movement may be varied without stopping the machine, by operating the hand wheels 413', 414' (Figs. 2, 5, 8 and 9) of which the hand wheel 413' operates to turn the disk 411 and through the gearing 415, 407, 405, change the position of the upper cam 400 circumferentially of the shaft 402, while the hand wheel 414' by similar mechanism effects the circumferential adjustment of the lower cam 401. It will be noted that each of these two cams is adjustable independently of the other, and I am thus enabled to time as desired (within wide limits) the opening movement of the knife, and, independently thereof, the closing or severing movement of the knife. Figs. 11 and 12 illustrate two different adjustments of the cams 400, 401 for closing and opening the knife 354 respectively, Fig. 12 being one of the limit positions governed by the engagement of the lugs 400', 401'.

Figures 16, 17, 18, 19:
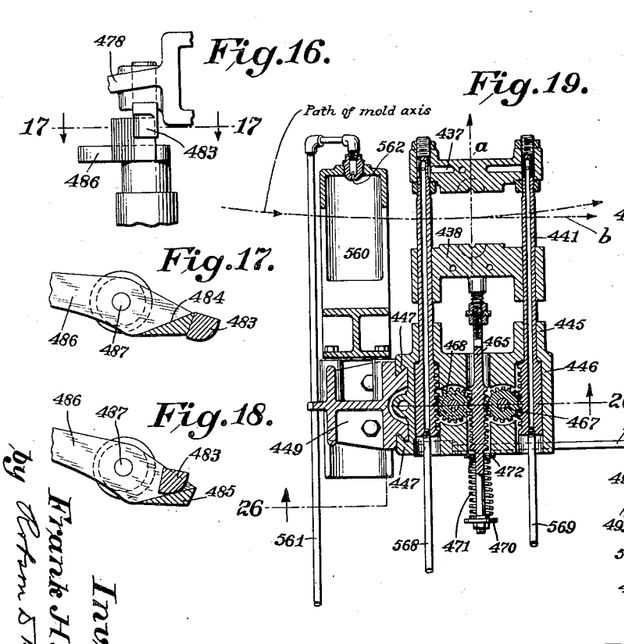
Fig. 16 is an elevation of certain parts shown in Figs. 19 and 20.
Figs. 17 and 18 are horizontal sections, taken in the plane indicated by the line 17—17 of Fig. 16.
Fig. 19 is a horizontal section on the line 19—19 of Fig. 2.

At about the same time with the severing stroke of the knife 354, the forming cup 437, 438 is opened to withdraw the temporary support from the lower end of the flowing glass and to allow the severed glass to drop into and through the funnel into the blank mold. The forming cup is cooled by water flowing through its channels 565, 567 from the connections described above. The fully open position of the forming cup as shown in Fig. 19, is obtained by the action of the spring 471. The forming cup is closed for a relatively short time only; for instance, it may be closed during about one-fourth of a revolution. The opening and closing of the forming cup is obtained by the mechanism shown in Figs. 16 to 20 and 26. In Fig. 19, the forming cup is open, and the cam arm 481 is just beginning to press the roller 480 and the lever 478 to the right. This will give a like movement to the link 475 and the crank arm 473, thus rocking the shaft 469 and the pinion 468 contra-clockwise. Owing to the engagement of said pinion, on opposite sides, with rack teeth on one of the rods 441 connected with the forming cup section 437, and with teeth on the rod 465 connected with the cup section 438, the cup sections will be moved equally in opposite directions, whenever the pinion 468 is rocked. The contra-clockwise movement of this pinion will cause the cup sections 437, 438 to move toward each other. As the lever 478 swings to the right, its projection 483 will ride on the inclined surface 484 of the lever 486, as illustrated by Fig. 18, the lever swinging slightly on its fulcrum 487, and the spring 491 yielding to permit such movement. As the lever 478 continues to swing to the right, and finally reaches the extreme position shown in Figs. 17 and 20, the projection 483 clears the end of the lever 486, and the latter under the influence of the spring 491 snaps back to its normal position shown in Figs. 17, 19 and 20 and the lever 478 is retained in this extreme position temporarily by the engagement of the projection 483 with the stop surface 485 at the end of the lever 486, this position being illustrated by Figs. 17 and 20. The spring 471 tends to pull the lever 478 toward the left, so as to keep the projection 483 against the stop surface 485. This position corresponds to the closed position of the forming cup, Fig. 21. It will be noted that the springs 463 provide a resilient connection between the rod 465 and the cup section 438, so as to avoid breakage such as might result if glass or some other obstacle prevented the cup sections 437, 438 from closing fully. As the cam arm 481 continues to rotate contra-clockwise from the position shown in full lines in Fig. 20, the forming cup 437, 438 will remain in its closed position until said arm 481 reaches the position indicated in dotted lines and comes into engagement with the lever 486 at the left of its fulcrum 487. As the cam arm 481 turns farther, its outer end will force the left-hand end of the lever outwardly, and therefore the right-hand end inwardly. The projection 483 and the lever 478 will thus be released, and the spring 471 will pull the lever over the left until it engages the hub portion of the cam arm 481 as in Fig. 19, the cup sections 437, 438 at the same time being moved apart equally, to the position shown in Fig. 19. The pinion 466 and the rack teeth (on the rods 465 and 441) engaged thereby are not absolutely essential, but avoid one-sided strains. The opening of the forming cup, under the influence of the spring 471, will be quick, so as to reduce the danger of glass sticking to one of the cup sections and being taken along thereby. However, too quick an opening movement would throw the lever 478 against the hub of the cam arm 481 with a sharp blow, and to prevent this, I have provided the dash pot 497. When the spring 471 moves the lever 478 and piston 496 to the left from the extreme position shown in Fig. 20, the movement will be quick at first, the dash pot opposing practically no resistance as long as air may escape therefrom through the side holes 500 as well as through the opening controlled by the valve 499. The opening movement of the forming cup is however slackened considerably as soon as the dash pot piston 496 moving to the left, covers the holes 500, so that the air can escape only through the opening controlled by the valve 499. The forming cup sections 437, 438 therefore will at first move apart very quickly, and then move slowly, and the rate of this slow movement may be adjusted by means of the valve 499.

The timing of the forming cup movements (opening and closing) may be varied without stopping the operation of the machine, by turning the hand wheel 507 (Figs. 2, 8 and 19) which adjusts the disk 505 (Fig. 5) and the cam arm 481 (through connections 508, 502, 501) circumferentially of the shaft 402. It will be understood that both this shaft and the cam arm 481 rotate, but the hand wheel 507 enables the said arm to be adjusted circumferentially, to vary its position relatively to those of the cams 401, 400 which govern the opening and the closing or cutting stroke respectively of the knife 354.

The horizontal direction $a$ in which the forming cup sections move toward and from each other (lengthwise of rods 441, 465, Fig. 19) is radial with respect to the axis of rotation of the carrier, and transverse of the direction in which the knife 354 reciprocates. In the particular and preferred arrangement shown, the direction $b$ of the knife movement is perpendicular to $a$, and parallel to a horizontal line intersecting the axes of the shafts 402, 389 and 457.

The forming cup 437, 438 may be adjusted up and down, so as to vary its vertical distance from the tank outlet 102 above and from the funnel, blank mold and associated parts (see Fig. 25) by turning the screw 450 (Fig. 26) in one direction or the other, after loosening the clamp screw 448. This adjustment is to regulate the action according to the smaller or greater viscosity of the molten glass.

The severed gob or charge of glass drops into and through the funnel or guide member 155, the inverted blank mold 243, and the neck mold 253, the position of these parts together with the nipple 269, plunger 273, and mechanism associated therewith being illustrated in Fig. 27. That is to say, said plunger is in its upper position and fits into the nipple so as to close the blank fold cavity 249 at the bottom and prevent glass from running out.

Following the delivery of the glass to the blank mold, it is given a preliminary treatment therein including a partial expansion by air to preliminarily shape the glass. The partially shaped blank is thereafter transferred to the blow mold 335 where it is further expanded or blown to final form.

What I claim is:

1. In a machine for making molded articles, traveling molded mechanism, means for supplying moldable material to said mechanism, a knife controlling the flow of material from said means, and for severing the material supplied by said means, said knife, during its severing movement, traveling in the same direction as the said molding mechanism, and a forming cup interposed between said knife and said molding mechanism.

2. In a machine for making molded articles, traveling molding mechanism, means for supplying moldable material to said mechanism, a knife controlling the flow of material from said means, and for severing the material supplied by said means, said knife, during its severing movement, traveling in the same direction as the said molding mechanism, and a forming cup interposed between said knife and said molding mechanism and consisting of complementary sections movable toward and from each other.

3. In a machine for making molded articles, traveling molding mechanism, means for supplying moldable material to said mechanism, a knife controlling the flow of material from said means, and for severing the material supplied by said means, said knife, during its severing movement, traveling in the same direction as the said molding mechanism, and a forming cup interposed between said knife and said molding mechanism, and consisting of complementary sections movable toward and from each other in a direction transverse to the path of said knife.

4. In a machine for making molded articles, traveling molding mechanism, means for supplying moldable material to said mechanism, a knife controlling the flow of material from said means, and for severing the material supplied by said means, said knife, during its severing movement, traveling in the same direction as the said molding mechanism, and a forming cup interposed between said knife and said molding mechanism, and consisting of complementary sections movable toward and from each other in a direction perpendicular to the path of said knife.

5. In a machine for making molded articles, a carrier rotatable about an upright axis, molding mechanism mounted on said carrier, with the axis of said mechanism parallel to the axis of rotation, means for supplying moldable material to said mechanism, a knife controlling the flow of material from said means, and for severing the material supplied by said means, said knife during its severing movement, traveling tangentially to the surface described by the axis of the molding mechanism, and in the same direction as said mechanism, and a forming cup interposed between said knife and said molding mechanism and comprising complementary sections movable toward and from each other in a path directed through the axis of rotation.

6. In a machine for making molded articles, a carrier rotatable about an upright axis, molding mechanism mounted on said carrier, with the axis of said mechanism parallel to the axis of rotation, means for supplying moldable material to said mechanism, a knife controlling the flow of material from said means, and for severing the material supplied by said means, said knife moving in a path tangential to the surface described by the axis of the molding mechanism, and a forming cup interposed between said knife and said molding mechanism and comprising complementary sections movable toward and from each other in a path normal to said surface.

7. In a machine for making molded articles, a carrier rotatable about a vertical axis, molding mechanism mounted on said carrier, the axis of said mechanism being parallel to the said vertical axis, means for supplying moldable material to said mechanism, a knife controlling the flow of such material and movable horizontally in a path tangential to the cylindrical surface described by the axis of the molding mechanism, and a forming cup interposed between said knife and said molding mechanism and comprising complementary sections movable toward and from each other horizontally in a path radial with reference to the vertical axis of rotation.

8. In a machine for making molded articles, a carrier rotatable about a vertical axis, molding mechanism mounted on said carrier, the axis of said mechanism being parallel to said vertical axis, a receptacle for moldable material, having an outlet located above said mechanism, a knife movable horizontally below said outlet and adjacent thereto, in a path tangential to the cylindrical surface described by the axis of the molding mechanism, and a forming cup interposed between said knife and said molding mechanism and comprising complementary sections movable toward and from each other horizontally in a path radial with respect to the vertical axis of rotation.

9. In a machine for making molded articles, a receptacle having a stationary outlet for moldable material, a knife arranged to reciprocate horizontally across said outlet to alternately open and close it, molding mechanism arranged to travel below said outlet in a direction corresponding to the path of the knife, and a forming cup interposed between said mechanism and said outlet, and comprising complementary sections movable toward and from each other in a path transverse to the path of the knife.

10. In a machine for making molded articles, a receptacle having a stationary outlet for moldable material, a knife arranged to reciprocate horizontally across said outlet to alternately open and close it, molding mechanism arranged to travel below said outlet in a direction corresponding to the path of the knife, and a forming cup interposed between said mechanism and said outlet, and comprising complementary sections movable toward and from each other.

11. In a machine for making molded articles, molding mechanism, means, located above said mechanism, for supplying moldable material thereto, a slide movable laterally, a trough carried by said slide and movable therewith in a plane between said molding mechanism and said supplying means and adapted to come into receiving relation under said supplying means, a forming cup likewise carried by said slide and adapted to come into receiving position under said supplying means, and means permitting adjustment of said forming cup relatively to the said slide, toward and from said supplying means.

12. In a machine for making molded articles, molding mechanism, means, located above said mechanism, for supplying moldable material thereto, a forming cup and a trough movable laterally in unison between said supplying means and said molding mechanism, to bring said cup and trough selectively into receiving relation to said supplying means, and means for adjusting said cup up or down relatively to said trough.

13. In a machine for making molded articles, molding mechanism, means for supplying moldable material thereto, a forming cup interposed between said molding mechanism and said supplying means, said cup comprising separable sections, two parallel racks connected with one of the cup sections, a central rack connected with the other section and parallel to the first-named racks, said central rack having teeth facing both of the first-named racks, an operating pinion interposed between the central rack and one of the racks of the other section, and another pinion interposed between said central rack and the other rack of the other section.

14. In a machine for making molded articles, molding mechanism, means for supplying moldable material thereto, a forming cup interposed between said molding mechanism and said supplying means, said cup comprising separable sections and being movable for adjustment toward and from said supplying means, parallel racks connected with the respective sections, and an operating pinion engaging racks of different sections and supported independently of the cup so as to remain stationary during adjustment of the cup toward and from the supplying means, the engaging surfaces of said racks and pinion being of sufficient extent to insure their permanent engagement throughout the range of the said adjusting movement of the cup.

15. In a machine for making molded articles, molding mechanism, means for supplying moldable material thereto, a forming cup interposed between said molding mechanism and said supplying means, said cup comprising separable sections and being movable for adjustment toward and from said supplying means, two parallel racks connected with one of said sections and sharing said adjusting movement, rack mechanism connected with the other section and sharing said adjusting movement, said rack mechanism being interposed between the first-named racks and parallel therewith, a pinion in engagement with said rack mechanism and with one of the first-named racks and sharing the said adjustment of the cup, and an operating pinion engaging said rack mechanism and the other rack of the other section and supported independently of the cup so as to remain stationary during adjustment of the cup toward and from the supplying means, the engaging surfaces of the operating pinion and of the racks engaged by it, being of sufficient extent to insure their permanent engagement throughout the range of said adjusting movement of the cup.

16. In a machine for making molded articles, molding mechanism, means for supplying moldable material thereto, a forming cup interposed between said molding mechanism and said supplying means, said cup comprising separable sections, spring means for moving said sections apart, a device for retarding such separation movement during its later stages and operating mechanism for bringing said sections to the closed position.

17. In a machine for making molded articles, molding mechanism, means for supplying moldable material thereto, a forming cup interposed between said molding mechanism and said supplying means, said cup comprising separable sections spring means tending to separate said sections, a dash pot for retarding such separation movement, and operating mechanism for bringing said sections to the closed position.

18. In a machine for making molded articles, molding mechanism, means for supplying moldable material thereto, a forming cup interposed between said molding mechanism and said supplying means, said cup comprising separable sections, spring means tending to separate said sections, a lever operatively connected with said sections, a cam arranged to move said lever in such a direction as to bring said sections together, and a device to retard the movement of the said lever when released from the influence of said cam.

19. In a machine for making molded articles, molding mechanism, means for supplying moldable material thereto, a forming cup interposed between said molding mechanism and said supplying means, said cup comprising separable sections, spring means tending to move said sections in one direction, a lever operatively connected with said sections, a spring-pressed locking member arranged to engage and temporarily hold said lever, and a cam arranged to move said lever in such a direction as to move the cup sections against the action of said springs means, said cam being also arranged to engage said locking member and bring it to the releasing position.

20. In a machine for making molded articles, molding mechanism, means for supplying moldable material thereto, a forming cup interposed between said molding mechanism and said supplying means, said cup comprising separable sections, spring means tending to separate said sections, an actuating lever operatively connected with said sections, a spring-pressed locking lever arranged to engage and temporarily detain said actuating lever, and a cam arranged to move said actuating lever in such a direction as to bring said sections together, said cam being also arranged to engage said locking lever and swing it to the releasing position.

21. In a machine for making molded articles, molding mechanism, means for supplying moldable material thereto, a forming cup having an open bottom interposed between molding mechanism and said supplying means, said cup comprising separable sections, parallel racks connected with the respective sections, a rocking drive pinion meshing with said racks and compelling said sections to move in opposite directions, and means for imparting an oscillatory motion to said pinion, said cup and said racks being adjustable as a unit relatively to said pinion while said racks remain in mesh with said pinion.

22. In a machine for making molded articles, molding mechanism, means for supplying moldable material thereto, a forming cup having an open bottom interposed between said molding mechanism and said supplying means, said cup comprising separable sections, spring means tending to separate said sections, parallel racks connected with the respective sections, a rocking drive pinion meshing with said racks and compelling said sections to move in opposite directions, and means for rocking said pinion in such a direction as to bring the cup sections together, said cup and said racks being adjustable as a unit relatively to said pinion while said racks remain in mesh with said pinion.

23. In a device for discharging viscid material, a receptacle having an outlet, a knife movable across said outlet, and means located on that side of said outlet toward which the knife moves while uncovering the outlet, for supplying a lubricant to that surface of the knife which is adapted for engagement with said outlet.

24. In a device for discharging viscid material, a receptacle having an outlet, a knife movable across said outlet, stationary cooling means located on that side of said outlet toward which the knife moves while cutting, and stationary means, located on that side of said outlet toward which the knife moves while uncovering the outlet, for supplying a lubricant to that surface of the knife which is adapted for engagement with said outlet.

25. In a device for discharging viscid material, a receptacle having an outlet, a knife movable across said outlet, a carrier for said knife, having cooling channels and transversely aligning nipples communicating with said channels, and a longitudinally reciprocating actuating member on which said nipples are supported pivotally.

26. In a device for discharging viscid material, a receptacle having an outlet, a knife movable across said outlet, a carrier for said knife, a longitudinally reciprocating actuating member, and means for connecting said carrier with said member pivotally to swing about a transverse axis.

27. In a device for discharging viscid material, a receptacle having an outlet, a knife movable across said outlet, a longitudinally reciprocating member for actuating said knife, and means for connecting said knife with said member pivotally to swing about a transverse axis.

28. In a device for discharging viscid material, a receptacle having an outlet, a knife movable across said outlet, a longitudinally reciprocating member for actuating said knife, said member being supported pivotally to swing about an axis parallel to the path of reciprocation, to bring the knife into or out of operative relation to said outlet, and means for keeping said member in its normal position in which it holds the knife in operative relation to said outlet.

29. In a device for discharging viscid material, a receptacle having an outlet, a knife movable across said outlet, a longitudinally reciprocating member for actuating said knife, said member being supported pivotally to swing about an axis parallel to the path of reciprocation, to bring the knife into or out of operative relation to said outlet, and a spring-pressed track engaged by said reciprocating member and normally keeping it in the position in which it holds the knife in operative relation to said outlet.

30. In a device for discharging viscid material, a receptacle having an outlet, a knife movable across said outlet, a longitudinally-reciprocating member for actuating said knife, said member being supported pivotally to swing about an axis parallel to the path of reciprocation, to bring the knife into or out of operative relation to said outlet, a spring-pressed track engaged by said reciprocating member and having a main portion which keeps said reciprocating member, during its normal stroke, in the position in which it holds the knife in operative relation to said outlet, said track also having an oblique portion which, when engaged by said reciprocating member, allows it to carry the knife away from such operative relation, and means for giving said member an abnormal stroke to bring it into engagement with said oblique track portion.

31. In a device for discharging viscid material, a receptacle having an outlet, a knife movable across said outlet, a longitudinally reciprocating member for actuating said knife, said member being arranged to normally hold the knife in operative relation to said outlet, but being movable transversely of the path of reciprocation, to carry the knife away from such operative relation, a spring-pressed track engaged by said reciprocating member and normally keeping it in the position in which it holds the knife in operative relation to the said outlet, and means for moving said track against the action of its spring, to allow the reciprocating member to carry the knife out of operative relation to the outlet.

32. In a device for discharging viscid material, a receptacle having an outlet, a knife movable across said outlet, a longitudinally reciprocating member for actuating said knife, said member being arranged to normally hold the knife in operative relation to said outlet, but being movable transversely of the path of reciprocation, to carry the knife away from such operative relation, a track extending lengthwise of the path of reciprocation and engaged by said reciprocating member, parallel links in which said track is mounted to change its position, and a spring tending to keep said track in a predetermined normal position.

33. In a device for discharging viscid material, a receptacle having an outlet, a knife movable across said outlet, a reciprocating rod arranged parallel to the path of the knife, a transverse arm held to reciprocate with said rod and also mounted to swing about the axis of the rod, said arm extending to opposite sides of said rod and being connected with said knife on one side of the rod, and a track engaging said arm on the other side of the rod.

34. In a device for discharging viscid material, a receptacle having an outlet, a knife movable across said outlet, and a knife support mounted to swing about an axis parallel to the path of the knife, to normally hold said knife in operative relation to the outlet, and to carry said knife out of such operative relation when desired.

35. In a device for discharging viscid material, a receptacle having an outlet, a knife movable across said outlet, a rocking lever operatively connected with said knife and having two arms, a shaft mounted to rotate about an axis parallel to the axis about which the lever rocks, and cams held to rotate with said shaft and arranged to engage and operate said arms to move the knife in opposite directions.

36. In a device for discharging viscid material, a receptacle having an outlet, a knife movable across said outlet, a shaft and two cams held to rotate therewith, a member operatively connected with said knife and mounted to rock about an axis parallel to said shaft, and rollers carried by said member on opposite sides of the plane containing the axes of the shaft and of the rocking member, said rollers being adapted to be engaged by the respective cams, to cause the knife to be moved in opposite directions.

37. In a device for discharging viscid material, a receptacle having an outlet, a knife movable across said outlet, a shaft and two cams held to rotate therewith, a member operatively connected with said knife and mounted to rock about an axis parallel to said shaft, said member having two portions adapted to be engaged by the respective cams, and means whereby, while the shaft continues to rotate, one of said cams may be adjusted circumferentially of said shaft.

38. In a device for discharging viscid material, a receptacle having an outlet, a knife movable across said outlet, a shaft and two cams held to rotate therewith, but each adjustable circumferentially of said shaft, a member operatively connected with said knife and mounted to rock about an axis parallel to said shaft, said member having two portions adapted to be engaged by the respective cams, and separate means, connected with the respective cams, whereby either of them may be adjusted circumferentially of said shaft independently of the other cam, while the shaft continues to rotate.

39. In a device for discharging viscid material, a receptacle having an outlet, a knife movable across said outlet, a shaft and two cams mounted thereon, one of said cams being loose on the shaft, a pinion held to rotate with said shaft, a gear wheel held to rotate with said loose cam, toothed wheels in mesh with said pinion and said gear wheel respectively, a shaft on which said toothed wheels are secured rigidly, a normally stationary disk in which said shaft is journaled, means for adjusting said disk circumferentially of the shaft while the latter is rotating, and a rocking member actuated by said cams and operatively connected with said knife.

40. The combination with a receptacle for molten glass having a downwardly opening discharge outlet, of a charge receiver mounted and operated to move along a path extending beneath and spaced a substantial distance below said outlet, severing means for periodically severing charges from glass issued from and depending below said outlet, and means for supporting and operating said severing means and for timing the operations thereof with respect to the movement of the charge receiver to cause said severing means to cut through a depending mold charge mass in substantially the same direction as the direction of movement of the charge receiver beneath the outlet and while the charge receiver is moving below the severing means in position to receive centrally therein the falling severed charge.

41. In glass feeding apparatus, a container having a downwardly opening discharge outlet, a removable annular wear plate at the lower end of said outlet, a retaining plate having a beveled edge portion engaging a complementarily beveled edge portion of said wear plate for securing the latter in place, said retaining plate having its lower surface normally flush with the lower surface of said wear plate, a combined shear and flow closing member slidable in contact with the lower surfaces of said wear plate and said retaining plate to and from position to cut off successive portions of glass issuing from the outlet and to temporarily close said outlet, and means for adjusting said retaining plate toward or from said wear plate while maintaining the latter in place to restore said normal relation of the contact surfaces of said plates should the same be impaired.

42. In a glass feeding machine, a container for molten glass having a discharge outlet in its bottom from which glass may issue in a column, means for severing successive charges from said column of glass, a forming cup located below said severing means and comprising separable sections, said forming cup being adapted when closed to mechanically engage and temporarily support the lower end of the glass column after each severing operation, means for opening and closing said cup in timed relation with the severing operations, and means for adjusting said cup vertically toward and from the plane of severance while preserving the driving connection between the cup sections and said means for opening and closing said sections.

FRANK H. LOBB.